No. 862,026. PATENTED JULY 30, 1907.
C. W. SMITH.
AUTOMATIC ALARM.
APPLICATION FILED DEC. 14, 1906.
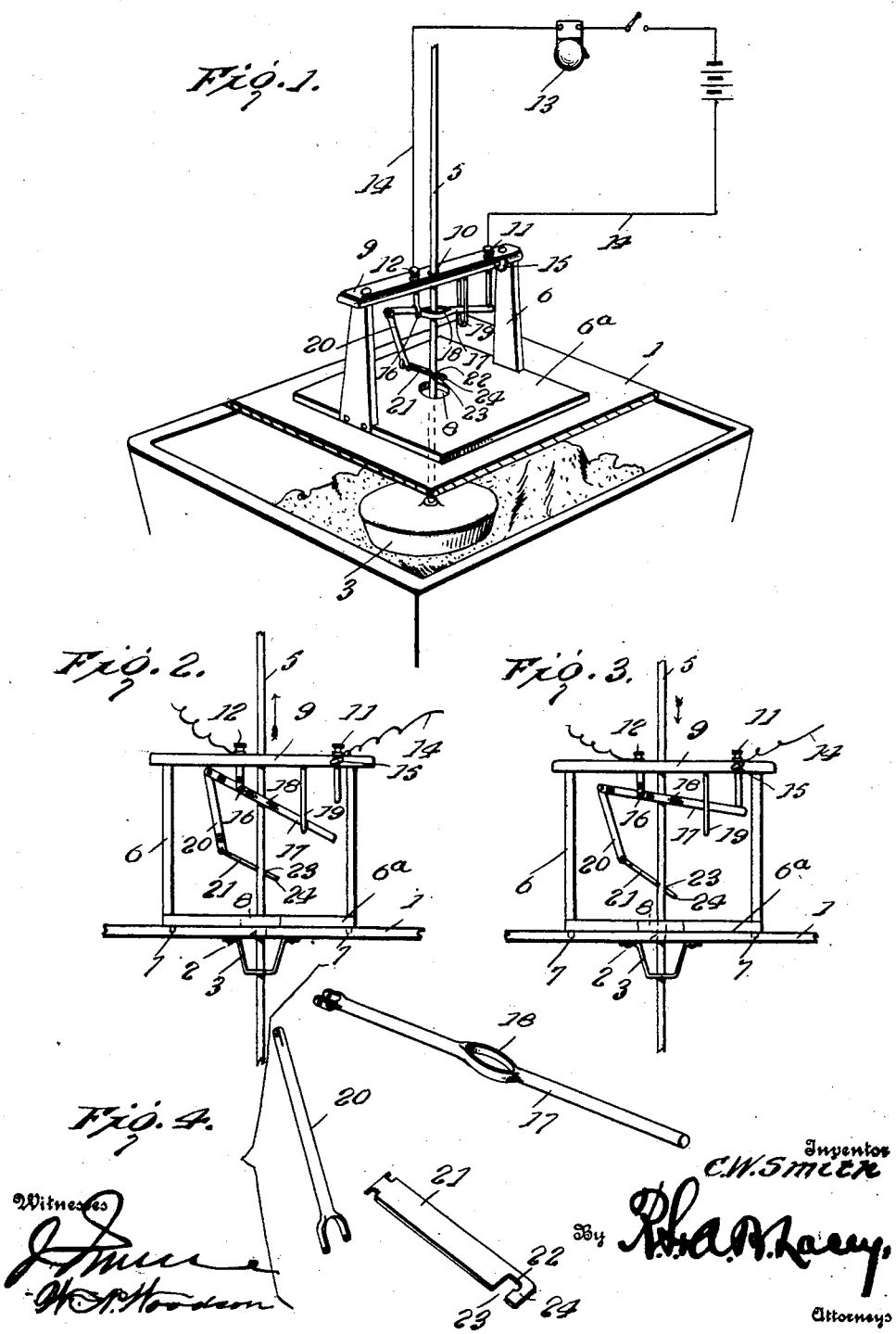

UNITED STATES PATENT OFFICE.

CHARLES W. SMITH, OF FREDERICKSBURG, OHIO.

AUTOMATIC ALARM.

No. 862,026.

Specification of Letters Patent.

Patented July 30, 1907.

Application filed December 14, 1906. Serial No. 347,889.

*To all whom it may concern:*

Be it known that I, CHARLES W. SMITH, a citizen of the United States, residing at Fredericksburg, in the county of Wayne and State of Ohio, have invented certain new and useful Improvements in Automatic Alarms, of which the following is a specification.

This invention contemplates an improved automatic alarm particularly designed for bakers' use, and which may be applied to any of the improved forms of dough mixers or the older forms of dough or sponge troughs.

One of the inconveniences connected with the trade of a baker is the liability of arising in the morning earlier than necessary to remove the dough or sponge from the mixer or trough or too late for the removal at the proper time, the former resulting in an unnecessary loss of sleep and the latter with bad results to the bread.

The primary object of my invention is to avoid this difficulty by the use of an improved construction of bakers' alarm, embodying a float adapted to rest upon a batch of dough or sponge, in such a manner that as the same rises, the float will be pushed upwardly until the yeast has expended its expanding or rising force at which point it will in a short time thereafter begin to drop, whereupon the float will also drop with it, and by means of an improved arrangement of parts will set off an audible signal or alarm by closing an electric circuit or the like so as to awaken the bakers and call their attention to the fact that the bread is ready to be taken.

For a full description of the invention and the merits thereof and also to acquire a knowledge of the details of construction of the means for effecting the result, reference is to be had to the following description and accompanying drawings, in which Figure 1 is a perspective view of my improved automatic alarm. Fig. 2 is a side elevation illustrating the parts in their relative positions assumed when the dough is rising. Fig. 3 is a similar view with the parts in different positions. Fig. 4 is a detail perspective view of the rocking arm, its suspension rod and gravity catch employed.

Corresponding and like parts are referred to in the following description and indicated in all the views of the drawings by the same reference characters.

Referring to the drawings, the numeral 1 designates the top of a dough or sponge raising trough, which may be of any desired construction, and which is here shown for the purposes of illustration only, said top being provided with a bearing orifice 2 and a bracket 3 underneath said orifice, and having an aperture in vertical alinement therewith.

4 designates the float adapted to rest upon the top of the batch of dough or sponge, and 5 designates a rod connected to said float, said rod passing freely through and guided by the orifice 2 and the aperture in the bracket 3.

A frame 6 is provided with a base 6ª, adapted to rest removably upon the top 1 of the trough, dowels 7 or the like being employed to maintain the frame in place. The base 6ª of the frame is provided with a centrally located opening 8 and with an elevated cross beam 9 which is provided with an orifice 10 also receiving and guiding the float rod 5. Terminals 11 and 12 are mounted in the cross beam 9 of the frame 6, the terminal 11 being preferably held therein by means of a set screw 15 so that it may be adjusted with its lower end at different elevations. The two terminals 11 and 12 are connected to an alarm 13 by means of leads 14, said alarm being in the present instance an electric bell and said bell and its leads being included in any suitable circuit. I prefer to use an electric bell as the audible alarm, owing to its adaptability to location at any distant point from the apparatus itself. The terminal 12 is provided with a lower bifurcated end 16 and a rocking arm 17 is pivotally mounted intermediate of its ends in the bifurcated end of the terminal 12, to swing in a vertical plane. In the preferable arrangement, the terminals 11 and 12 are on opposite sides of and in substantial alinement with the float rod 5, and the rocking arm 17 is also in alinement with both terminals and accommodates the float rod by means of an opening 18, by which it encircles the said rod. A limiting and guiding loop 19 depends from the cross beam 9 of the frame 6 and the free end of said rocking arm 17 fits therein. A suspension rod 20 swings freely from the opposite end of said rocking arm 17 and carries at its lower end a freely swinging gravity catch 21 which in the present instance is in the form of a plate pivotally secured to the lower end of the suspension rod 20 at one end and connected thereto to swing in a vertical plane, and provided at its free end with an opening 22 and a transverse slot 23 leading thereinto from one side. The said opening 22 and slot 23 produce a hook 24 at the free end of the catch 21, the said hook being intended for engagement with the float rod 5. The slot 23, in the preferable construction, is just wide enough to permit the rod to pass through it, while the opening 22, which is in effect an enlargement or widening of the slot at the inner end thereof, is of larger diameter than the float rod 5. This proportion of the parts, in connection with the freely swinging character of the catch 21, enables the catch to receive the rod 5 when the catch is held in a horizontal plane, and is thrust upon the rod with a sidewise movement. The catch is then permitted to drop and will manifestly have a canting or clutch loop effect upon the rod, as the opposite walls of the enlargement or opening 22 will bind upon diametrically opposite points of the float rod and prevent the independent or relative movement of the rod with respect to the catch, in a downward direction. Conversely the upward movement of the rod with respect to the catch will be freely permitted, as this movement will have a tendency to swing the catch upwardly so as to allow the float rod to slide freely through the opening 22.

From the foregoing description, in connection with the accompanying drawings, it is manifest that the construction and arrangement of the parts and their consequent relative movement or action, will result in the following effects:—When the float 4 is first rested upon the batch of dough or sponge in the trough, and the hook 24 is passed around the float rod 5, the rising action of the dough or sponge will merely result in an upward movement of the float, and a consequent upward movement of the rod 5 with a freely sliding relative action between said rod and the gravity catch 21, without imparting any movement to the rocking arm 17. This action will continue until the expansive force of the yeast has expended itself, and then, after a definite interval has elapsed, the dough or sponge will begin to settle or lower. This lowering action will obviously result in the downward movement of the float and its rod, and this downward movement will no longer be independent of the rocking arm 17, but owing to the canting effect of the gravity catch 21 upon said rod 5, will result in drawing the catch downwardly and consequently locking the arm 17 through the instrumentality of the connecting suspension rod 20, so that the free end of the rocking arm 17 will finally be moved into contact with the lower end of the terminal 11 and close the electric circuit to sound the alarm. If desired the lower end of the said terminal may be provided with a recess 11ª to partially receive the free end of the rocking arm 17, to insure proper contact.

In order to provide means for varying the interval elapsing between the point at which the dough or sponge has reached its highest level, and the time for sounding the alarm, the terminal 11 is adjustably mounted as before described, so that its lower end may be held at different elevations with respect to the free end of the rocking arm 17 and may consequently be engaged by said arm at the termination of a shorter or longer interval.

It is obvious that I may include a switch in the electric circuit near the bell, so that the circuit may be opened and the bell stopped, for without such a switch, the bell would continue to ring until some one arrived at the shop.

Having thus described the invention, what is claimed as new is:

1. In a device of the character described, the combination with an alarm, of means for operating the same, said means comprising a float, a rod connected to said float, and a gravity catch designed to engage said rod and having a sliding connection therewith when the rod is moved in one direction, but binding thereon when the rod is moved in the reverse direction.

2. A device of the character described, comprising an alarm, a rocking arm adapted to effect an actuation of said alarm, a float, a rod connected to said float, and a catch operatively connected to said alarm, said catch adapted to automatically cant upon said rod into binding engagement therewith, whereby the rod may be moved independently of the catch in one direction, but will cause the catch to move with it when moved in the opposite direction.

3. In a device of the character described, the combination of an alarm, a rocking arm arranged to effect the actuation of said alarm, a float, a rod connected thereto, and a gravity catch suspended from said arm and provided with an opening receiving said rod and of slightly larger diameter than the same, whereby the upward movement of said rod may be permitted independently of any movement of the catch and whereby the downward movement of the rod will cause the catch to bind thereon, and move downwardly therewith to rock the arm.

4. In a device of the character described, the combination of an electric alarm, terminals therefor, a rocking arm pivotally connected to one of said terminals and arranged to rock into and out of engagement with the other terminal, a suspension rod connected to said arm, a gravity catch suspended from said rod, a float, and a rod connected to said float, the catch being arranged for detachable canting engagement with said rod, for the purpose specified.

5. A device of the character described, comprising an electric alarm, terminals therefor, a rocking arm pivotally connected between its ends to one of said terminals and adapted to be moved at one end into and out of engagement with the other terminal, a suspension rod connected to the other end of the said arm, a gravity catch freely swinging from the suspension rod, and provided with a side slot and an enlargement or opening at the inner end thereof, a float, and a rod connected to said float, the rod being adapted for insertion through said slot into the enlargement or opening, and having a tilting or canting engagement therewith, substantially as set forth.

6. In a device of the character described, the combination of an alarm, a rocking arm arranged to effect the actuation of said alarm, a float, a rod connected to said float, and a gravity catch operatively connected to said rocking arm, said catch provided with a side entering slot and an enlargement or opening at the inner end of said slot, the said catch receiving the rod through the slot into the enlargement or opening, and being adapted to cant thereon into binding engagement therewith, as set forth.

7. In a device of the character described, the combination of an alarm, a rocking arm arranged to effect the actuation of said alarm, a float, a rod connected to said float, and means whereby the movement of said rod in one direction will rock said arm, and in the other direction will be independent of said arm.

8. In a device of the character described, the combination of an electric alarm provided with terminals, a rocking arm preferably connected to one terminal and adapted to swing into and out of contact with the other terminal, means for supporting said last named terminal at different distances from said end of the rocking arm, for the purpose specified, a float, a rod connected to said float, and means whereby the upward movement of said float and rod will be independent of the rocking arm and whereby the downward movement of said float and rod will effect a rocking of said arm in a direction to carry one end thereof into engagement with said terminal.

In testimony whereof I affix my signature in presence of two witnesses.

CHARLES W. SMITH. [L. S.]

Witnesses:
HARRY H. WILHELM,
E. RAYMOND SUPER.